United States Patent [19]

Akhtar

[11] Patent Number: 5,089,248
[45] Date of Patent: Feb. 18, 1992

[54] PRODUCTION OF METALLIC OXIDES

[76] Inventor: Masud Akhtar, 8 Wexford Dr., Lawrenceville, N.J. 08648

[21] Appl. No.: 523,326

[22] Filed: May 14, 1990

[51] Int. Cl.$^5$ .............................................. C01G 1/02
[52] U.S. Cl. .................................. 423/604; 423/606; 423/608; 423/618; 423/622; 423/624; 423/641; 423/643; 423/592
[58] Field of Search ............... 423/604, 608, 606, 622, 423/618, 624, 641, 643, 642, 592; 556/467, 477, 478

[56] References Cited

U.S. PATENT DOCUMENTS

| | | | |
|---|---|---|---|
| 2,441,214 | 5/1948 | Thomas et al. | 585/475 |
| 2,500,761 | 3/1950 | Lewis | 556/467 |
| 2,615,034 | 10/1952 | Hyde | 556/467 |
| 3,509,073 | 4/1970 | Bowman | 423/622 |
| 4,193,769 | 3/1980 | Cheng et al. | 423/622 |
| 4,347,229 | 8/1982 | Schmid et al. | 423/618 |

FOREIGN PATENT DOCUMENTS 893522  4/1962  United Kingdom ............... 423/337

Primary Examiner—Michael Lewis
Assistant Examiner—Stuart L. Hendrickson
Attorney, Agent, or Firm—George E. Kersey

[57] ABSTRACT

Metal oxides prepared by exchange reactions between organosemiconductor oxides (such as disiloxanes) and metal coordination compounds (such as neutral metal complexes, metal chelates and chlorometalates), metallic halides (such as zinc chloride), or organometallic compounds (such as methyllithium) in inert environments and anhydrous solvents.

14 Claims, No Drawings

PRODUCTION OF METALLIC OXIDES

BACKGROUND OF THE INVENTION

This invention relates to the production of metallic oxides, and more particularly, to the production of such oxides under "mild" reaction conditions.

There is a need for a wide variety of metallc oxides. They are used as transparent electrical conductors, superconductors, electrochromic materials and catalysts. They are also used for battery electrodes and electrolytes, coatings, paints, membranes and ceramic bodies. The available production methods for such oxides are not entirely satisfactory.

Generally, metallic oxide production is by hydrothermal reactions of metal salts, metal alkoxides, and sol-gels, followed by pyrolysis. These methods involve material degradation, and the inclusion of different chemical compositions in the bulk material phase. Other methods use RF (radio frequency) sputtering from compact metal oxide targets; CVD (chemical vapor deposition) or plasma processes in volatile metal oxide precursor compounds; or high temperature pyrolysis of metalorganic compunds. These methods have drawbacks such as possible inclusion of impurities due to energetic and high temperature environments, undesired residues, and associated high processing costs, as well[1] as environmental and personnel hazards.

Accordingly, it is an object of the invention to facilitate and simplify the production of metallic oxides, and to realize oxide compositions at low cost, avoiding many of the objections associated with prior and current methods.

Another object of the invention is to deposit metallic oxides at a comparatively low temperature, while simultaneously maintaining a comparatively high rate of deposition. A related object is to facilitate the depositions in thin film form.

A further object of the invention is to achieve electroactive oxide deposits with controlled thickness or particle size. A related object is to achieve controlled thicknesses which have increased uniformity of thickness.

A still further object of the invention is to achieve the deposit of metal oxides on general substrates with prescribed areal configurations.

SUMMARY OF THE INVENTION

In accomplishing the foreqoing and related objects, the invention provides for the production of metal oxides by facile chemical reactions between organosemiconductor oxides and metallic compounds, including halides, organometallics and coordination compounds (such as metal chelates, chlorometalates, and neutral metal complexes). Illustrative organosemiconductor oxides include the organodisiloxanes.

In the case of neutral metal complexes, the coordinating ligand used in their preparation makes their resulting complexes soluble in orqanic, i.e. anhydrous, solvents and results in a low melting compound. In organic liquid solutions, the ligand is easily labile, can be sterically unhindered, and leaves the reaction site after oxide deposition. The ligand is a low cost and nontoxic compound. The presence of such ligands in the complex, inhibits undesired side reactions, such as a disproportionate amount of metal halide salts. The ligands also displace water of crystallization associated with certain metal salts, moderate otherwise vigorous reactions, and facilitate controlled oxide deposition reactions in dry and inert environments from coating compositions of desired viscosity and components.

The deposition reactions are carried out in an inert gas atmosphere such as argon or helium, and can involve liquid-liquid, solid-liquid, solid-gas, liquid-gas or gas-gas reactions.

In accordance with one aspect of the invention a method of preparinq metallic oxides includes the steps of (a) providing solution of a metallic compound in an anhydrous solvent; and (b) reacting the metallic compound with a Group IV organosemiconductor oxide. The organosemiconductor oxide reacts with the metallic compound to deposit a metallic oxide, and the reaction site is left with a volatile or soluble organosemiconductor residue.

The metallic compound is a metallic coordination compound, such as a metal complex containinq ligands coordinatinq through nitrogen, phosphorous, oxygen or sulfur atoms. Or the metallic coordination compound can be selected from the class of metal chelates and chlorometalates.

Alternatively, the metallic compound can be a metallic halide or an organometallic compound.

In accordance with another aspect of the invention, the organosemiconductor oxide is an organosilicon oxide, such as a siloxane, which can be selected from the class consisting of hexamethyldisiloxane, hexaethyldisiloxane, hexaphenyldisiloxane and 1, 1, 3, 3-tetraphenyl-1-3-dimethyldisiloxane.

In a method of producing a metallic oxide coating, the steps can include (a) dissolving a metallic halide in an organic solvent; and (b) reacting the metallic halide in solution with a siloxane at a temperature in the ranqe of from about $-20°$ to $300°$ C.

The metallic halide can be formed from Group II and III elements including zinc and aluminum. The process stream can include the introduction of halogenous boron compounds, such as boron trichloride and boron trifluoride, in the range from about 1–10% by weight. When the deposition takes place at about $100°$ C., it produces a coating with a resistivity of about $2 \times 10^{-3}$ ohm-centimeter, a thickness of about one to three microns and a transmissibility for light of about 8 to 95%.

The [the] deposit can be made by spraying on a glass substrate at a temperature of about $250°$ C. and an aerosol used as a carrier for the reactants.

In a method of producing zinc oxide, the steps can include (a) providing zinc chloride dissolved in triethanola[i]mine; and (b) reacting the zinc chloride with hexamethyldisiloxane in ether at a temperature in the range from about $-20°$ to $100°$ C.

When zinc chloride dipyridine is employed as the reactant in dichloromethane solvent the result is the production of zinc oxide particles of submicron size.

When different concentrations of reactants are employed at a temperature in the range from $20°$ to $600°$ C. there is control of particle size.

In a method of depositing transition metal oxide particles, the steps include (a) providing a transition metal neutral complex in dichloromethane; and (b) reacting the metal complex with a stoichiometric amount of hexamethyldisiloxane at a temperature in the range from about $20°$ to $60°$ C.

For the deposit of transition metal oxide thin films having about 100Å to 3000ÅÅ, the steps include (a)

providing a transition metal neutral complex in benzene, and (b) reacting the metal comple[s]x with a stoichiometric amount of hexamethyldisiloxane at a temperature in the range from 20° to 100° C.

The transition metal oxide can be deposited on a glass substrate at a temperature in the range from 100° to 500° C. and an aerosol used as a carrier for the reactants.

The foregoing, as well as other aspects and advantages of the invention, will be apparent from the detailed description which follows.

DETAILED DESCRIPTION OF THE INVENTION

The invention is illustrated by the following, non-limiting examples.

1. Preparation of Silver Oxide

A metallic compound in the form of silver chloride (AgCl) is dissolved (about 190 gm/liter) in calcium chloride ($CaCl_2$) [in] saturated dimethylsulfoxide to form $Ca(AgCl_2)_2$.

Silver oxide is the produced by treating the foregoing solution with a stoichiometric amount of hexamethyldisiloxane in ethyl ether.

$Ag_2O$ immediately precipitates, leaving calcium chloride and trimethyl-chlorosilane in the supernatent liquid.

The reaction is summarized in equation (1), below.

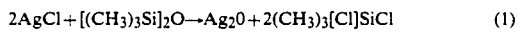

$$2AgCl + [(CH_3)_3Si]_2O \rightarrow Ag_2O + 2(CH_3)_3[Cl]SiCl \quad (1)$$

The particle size of $Ag_2O$ can be controlled by adjusting the concentration of the reactants. Silver oxide produced by this process is very pure. It possesses superior material properties, when washed and dried from residual solvent.

2. Preparation of Zinc Oxide

Zinc oxide of a particle size ranging from about 0.1 micron to 0.2 micron is prepared by mixing equimolar solutions of zinc chloride and hexamethydisiloxane in ethylether at a temperature of 0° C.

At temperatures higher than 0° C., and in the range from about 20°-80° C., the reaction rate for the deposition of zinc oxide is very rapid. Zincite can be prepared with a desired particle size by controlling the reactant concentrations.

When triethyleneglycoldiamine complex of zinc chloride is added to an equimolar solution of hexamethydisiloxane in ethylether or dichloromethane, greater control over the deposition of zinc oxide particles is achieved.

When compounds like $AlCl_3$ or $InCl_3$ are included with the zinc chloride in a molar concentration of 1-4%, conductive zinc oxide particles are achieved. A compressed pellet of aluminum doped zinc oxide (produced at 800psi) with 0.5 mm thickness had a resistivity of $10^{-5}$ ohm cm.

By adjusting concentrations and reaction temperatures in the range of $-20°$ to 100° C., zinc oxide particles with controlled dimensions are easily prepared and find many applications such as use in varistor materials, coatings and powders. Similarly, zinc oxychlorides can also be prepared by controlling the reactant ratios.

Transparent conductive coatings of zinc oxide doped with boron or aluminum can be deposited by mixing 0.5-19 by weight percent boron or aluminum halides or alkyls in ether solutions of $ZnCl_2 \cdot 2Py$ (where Py is 2-metho[z]xypy[s]ri[t]dine) and reacted with stoichiometric amounts of $(CH[h_3]_3Si)_2O$ in a minimum volume of ether. The viscosity of these compositions can be adjusted by suitable amounts of solvents to give stable and processable coating compositions. Substrates (glass, metallic or ceramic) or devices coated with these compositions, and heated under argon in the temperature range of 50° to 100° C., can be covered by zinc oxide thin films of desired thickness. Such films are 80-92% transparent for light in the visible range, with 0.5 to 3 microns in thickness. A typical resistivity of boron doped zinc oxide is $2 \times 10$ ohm-centimeters. Such films of zinc oxide can be further heated at 250° C. or above to control the crystalline morphology of the deposit.

Transparent conductive coatings of zinc oxide can also be produced by sprayinq the solutions of $ZnCl_2[.2N(CH_2OH)_2]$ and $[(CH_3)_3Si)_2O]$ on a common substrate surface at a temperature in the range from about 100° C. to 600° C.

By this process, transparent conductive coatings of ZnO can be deposited on very large area substrates at low cost. Such coatings find applications in the manufacture of low emissivity structural glass, and as window material for photovoltaic devices, among numerous other uses.

3. Preparation of Molybdenum Oxide

The molybdenum complex, tribromotripyridinemolybdenum ($MoBr_3Py_3$, where Py is pyridine), is moderately soluble in chloroform. When a chloroform solution of this complex is added to an excess of one molar dichloromethane solution of hexamethyldisiloxane at a temperature in the range from about 20 to 50° C., molydenum oxide, $MoO_3$, settles at the bottom of the reaction vessel.

4. Preparation of Iridium Oxide dium complexes of the type $[1]Ir(CO)_2ClL$, where L is a para-toluidine ligand ($p-H_2N-C_6H_4-CH_3$), are monomeric and very soluble in benzene. When benzene solutions of such complexes are added to stoichiometric solutions of hexamethyldisiloxane in 2:1 benzene:petroleum ether (boiling point 100°-120° C.) at 20° to 60° C., iridium oxides, IrO [s]precipitates.

5. Preparation of Lithium Oxide

When equal volumes of ethyl ether solutions of two molar methyllithium and one molar hexamethyldisiloxane are mixed at room temperature or below, lithium oxide $Li_2O$ is deposited, leaving tetramethylsilane $Si(CH_3)_4$ in the solvent.

6. Preparation of Transition of Metal Oxides

Most of the metals of the first transition series, as well as many others in the Periodic Table, form neutral complexes with pyridine (Py - $C_5H_5N$) and aniline ($C_5H_5NH$), of the type $MX_22Py$, where M is a metal ion and X is a halide ion. These complexes have limited solubility in organic solvents, but the use of substituted pyridines like 4-methylpyridine, 2-methylpyridine, 2-ethylpyridine, 4-tet-butylpyridine, greatly enhances their solubility in ordinary solvents like dichloromethane, alcohols, dimethylformamide, benzene or nitrobenzene.

Whe stiochiometric amounts of the solutions of these complexes are added to hexamethyldisiloxane solutions, the required metal oxides can be deposited in a very pure form at temperatures in the range from about 20°-100° C.

The deposited oxides can be further converted into desired phases or modifications by known processes.

7. Preparation of Nickel Oxide

Instead of neutral complexes, several simple chelates such as complexes of 1,2-ethylene morpholine [O(CH$_2$-CH$_2$)$_2$NCH$_2$CH$_2$N(CH$_2$CH$_2$) O] can also be employed as feedstock for the specific oxide depositions. For example, when equimolar solutions of hexamethyldisiloxane and 1,2-ethylene morpholine complex of nickel chloride [Ni(ethylenemorpholine)Cl$_2$] are refluxed in nitrobenzene, nickel oxide is quantitativel deposited.

8. Preparatiomn of Zirconium Oxide

When equimolar solutions of zi[n]rcon[yl]ium oxychloride (ZrOCl$_2$) and hexamethydisiloxane are heated to reflux in ethylether, zi[n]rconium dioxide (ZrO$_2$) is deposited in quantitative amounts.

9. Prepartation of Indium Tin Oxide

When mixtures of indium triohloride with small amounts of tin tetraohloride in ethylether are sprayed on a hot glass substrate at 300° C., along with equimolar solutions of hexamethyldisiloxane in ether, a transparent conductive coating of indium tin oxide is obtained with a resistivity of $10^{-2}$ ohm cm and a thickness of 1.5 microns.

It will be appreciated that the foregoing examples are merely illustrative, and that other examples and methods in accordance with the invention will be readily apparent to those of ordinary skill in the art.

What is claimed is:

1. A method of preparing metallic oxides, conisting essentially of:
   (a) providing a solution of a metallic compound with a metallic component selected from lithium, silver, zinc, indiun, tin, zirconium, molybdenum, irridium and nickel in an anhydrous solvent;
   (b) reacting said compound with an organodisiloxane; whereby said organodisiloxane reacts with the metallic compound to deposit a metallic oxide; and
   (c) recovering said metallic oxide.

2. The method of claim 1 wherein the metallic compound is a metallic coordination compound.

3. The method of claim 2 wherein the metallic coordination compound is a neutral metal complex contining ligands coordinating through nitrogen, phosphorous, oxygen or sulfur atoms.

4. The method of claim 1 wherein the metallic compound is a metallic halide.

5. The method of claim 1 wherein the metallic compound is an organometallic compound.

6. A method of preparing metallic oxides in accordance with claim 1 wherein a metallic compound in the form of silver chloride (AGCl) is dissolved in clacium chliride (CaCl$_2$) saturatred dimethylsulfoxide to form Ca(AgCl$_2$)$_2$; silver oxide is then produced by treatng the foregoing solution with a stoichiometric amount of hexamethyldisiloxane in ethyl ether; and Ag$_2$O immediately precipitates, leaving calcium chloride and trimethyl-chlorosilane (CH$_3$)$_3$SiCl in the supernatent liquid.

7. A method of preparing metallic oxides in accordance with claim 1 wherein the concentration of the reactants is adjusted.

8. A method of preparing metallic oxides in accordance with claim 1 wherein zince oxide of a particle size ranging from about 0.1 micron to b 0.2 micron is prepared by mixing equimolar solutions of zinc chloride and hexamethydisiloxane in ethylether at a temperature of about 0° C.

9. A method of preparing metallic oxides in accordance with claim 1 wherein at temperatures higher than 0° C., the reaction rate for the deposition of metal oxide is increased.

10. A method of preparing metallic oxides in accordance with claim 1 wherein a triethylenglycoldiamine complex of metal halide is added to an equimolar solution of hexamethyldisiloxane in ethylether or dichloromethane.

11. A method of preparing metallic oxides in accordance with claim 1 wherein concentrations and reaction temperatures are adjusted in the range of $-20°$ to $100°$ C., to prepare metal oxide particles.

12. The method of claim 1 wherein said organodisiloxane is selected from the group consisting of hexamethyldisiloxane, hexaethyldisiloxane, hexaphenyldisilozane and 1, 1, 3,3-tetraphenyl-1-3-dimethyldisiloxane.

13. The method of claim 1 wherein said organodisiloxane is selected from the group consisting of hexamethyldisiloxane, hexaethyldisiloxane, hexaphenyldisiloxane and 1, 1, 3, 3-tetraphenyl-1-3-dimethyldisiloxane.

14. A method of preparing metallic oxides in accordance with claim 1 wherein a metallic compound in the form of the molybendum complex, tribromotripyridinemolybdenum (MoBr$_3$Py$_3$, where Py is pyridine), is disolved in chloroform and added to an excess of one molar dichloromethane solution of hexamethyldisiloxane at a temperature in the range from about 20 to 50° C., with the result that molydemum oxide, MoO$_3$, settles at the bottom of the reaction vessel.

* * * * *